United States Patent
Lee (10) Patent No.: US 8,674,974 B2
(45) Date of Patent: Mar. 18, 2014

(54) POWER SUPPLY DEVICE, PANEL DRIVING DEVICE AND POWER SUPPLY CONTROL METHOD FOR DISPLAY DEVICE

(75) Inventor: Joo-Byung Lee, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 617 days.

(21) Appl. No.: 12/988,708

(22) PCT Filed: Apr. 13, 2009

(86) PCT No.: PCT/KR2009/001889
§ 371 (c)(1),
(2), (4) Date: Oct. 20, 2010

(87) PCT Pub. No.: WO2009/131325
PCT Pub. Date: Oct. 29, 2009

(65) Prior Publication Data
US 2011/0043509 A1    Feb. 24, 2011

(30) Foreign Application Priority Data
Apr. 24, 2008 (KR) .......... 10-2008-0038115

(51) Int. Cl.
*G06F 3/038* (2013.01)
(52) U.S. Cl.
USPC ........................................ 345/211
(58) Field of Classification Search
USPC .......................... 345/211–214, 204
See application file for complete search history.

(56) References Cited

U.S. PATENT DOCUMENTS

2005/0242789 A1* 11/2005 Kang ............................. 323/224
2008/0258692 A1* 10/2008 Heinz et al. ...................... 322/28

FOREIGN PATENT DOCUMENTS

| KR | 10-2001-0004130 | 1/2001 |
| KR | 10-2002-0046661 | 6/2002 |
| KR | 10-2004-0018658 | 3/2004 |

OTHER PUBLICATIONS

International Search Report issued in PCT/KR2009/001889 dated Nov. 16, 2009.

* cited by examiner

*Primary Examiner* — Dennis Joseph
(74) *Attorney, Agent, or Firm* — Ked & Associates, LLP (57) ABSTRACT

The present invention relates to a display device. There is disclosed a power supply unit and of a display device and a method thereof that can reduce frequency interference by electro-magnetic interference (EMI).

A power supply unit of a display device according to an exemplary embodiment of the present invention for supplying power to a signal processor and a lamp of the display device includes: an AC input section receiving and supplying AC power; a converter section converting the AC power into DC power and supplying power to the signal processor; an inverter section converting the DC power into the AC power and supplying power to the lamp; and a mi-com having main ICs and feedback circuits of the converter section, the inverter section, and the signal processor, wherein a DC filter for converting noise frequencies generated by operating the circuits into signals of a pulse type is provided in the converter section and the inverter section and the mi-com differently sets control signals outputted from the converter section and the inverter section by using an analysis result of the pulse signals outputted from the DC filter portion.

14 Claims, 5 Drawing Sheets

FIG.8

POWER SUPPLY DEVICE, PANEL DRIVING DEVICE AND POWER SUPPLY CONTROL METHOD FOR DISPLAY DEVICE

BACKGROUND OF THE INVENTION

1. Field of the Invention

The present invention relates to a display device, and more particularly, to a power supply unit of a display device and a method thereof that can reduce frequency interference by electromagnetic interference (EMI).

2. Description of the Related Art

In recent years, in an informatization society, an importance of a display panel as a visual information transfer medium has been further emphasized. From now on, requirements such as lower power consumption, quantification, high-quality, and the like should be satisfied in order to occupy an important post.

The display panel may be classified into an emission type such as cathode ray tube (CRT), an electro luminescence (EL), a light emitting diode (LED), a vacuum fluorescent display (VFD), a field emission display (FED), a plasma display panel (PDP), and the like, which itself emits light and a non-emission type such as a liquid crystal display (LCD), which itself cannot emit light.

The display panel includes a driver for applying pulses to a plurality of electrodes. A power supply unit of the display device supplies power in order to operate the driver. In this case, AC input power is applied to the power supply unit of the display device.

At this time, in general, noise is generated in another electrical, electronic apparatus or system, such that noise is generated on an input terminal to which the power of the display device is applied through a power supply line.

The noise is known generically as electro-magnetic compatibility (EMC) and may be divided into electro-magnetic interference (EMI) and electro-magnetic susceptibility (EMS). EMI, that is, electro-magnetic interference represents a phenomenon in which needless electromagnetic waves generated from diversified electrical and electronic equipments cause electro-magnetic interference in other apparatuses and electro-magnetic susceptibility (EMS) represents electro-magnetic sensitivity of a predetermined apparatus to an external electro-magnetic environment.

Reinforcing electro-magnetic resistance of the display device itself by reducing EMI noise unnecessarily generated from the electrical and electronic apparatuses as possible and reducing electro-magnetic susceptibility to the external electro-magnetic environment meets electro-magnetic compatibility.

Herein, a lot of electro-magnetic interference (EMI) noise which is one of electro-magnetic compatibility (EMC) is generated by an influence of an external apparatus through an input line of an input terminal in the display device. The electro-magnetic interference noise deteriorates sound quality of a module of the display panel or induces a malfunction of a circuit formed in the module of the display panel.

SUMMARY OF THE INVENTION

The present invention has been made in an effort to provide a power supply unit of a display device and a method thereof that can more economically and efficiently reduce EMI noise.

An exemplary embodiment of the present invention provides a power supply unit of a display device that includes: an AC input section receiving and supplying AC power; a converter section converting the supplied AC power into DC power and supplying the converted DC power to a signal processor; an inverter section converting the DC power outputted from the converter section into the AC power; and a controller comparing at least two of switching frequencies of the converter section, the inverter section, and the signal processor with each other and adjusting the switching frequency of at least one of the converter section, the inverter section, and the signal processor in accordance with the comparison result.

Meanwhile, another exemplary embodiment of the present invention provides a display panel driving unit that includes: a signal processor processing an image signal supplied to the display panel; an AC input section receiving and supplying the AC power; a converter section converting the supplied AC power into DC power and supplying the converted DC power to a signal processor; and an inverter section converting the DC power outputted from the converter section into the AC power, wherein the signal processor includes a mi-com that compares the switching frequencies of the converter section, the inverter section, and the signal processor with each other and adjusts the switching frequency of at least one of the converter section, the inverter section, and the signal processor in accordance with the comparison result.

Meanwhile, yet another exemplary embodiment of the present invention provides a power supply control method of a display panel driving unit that includes: receiving switching frequencies of a converter section, an inverter section, and a signal processor; calculating differences among the received switching frequencies; and adjusting the switching frequency of at least one of the converter section, the inverter section, and the signal processor when the calculated differences among the switching frequencies are equal to or less than a reference value.

According to exemplary embodiments of the present invention, an EMI filter needs not to be provided in each of electronic circuit elements and EMI noise can be more economically and efficiently reduced.

DETAILED DESCRIPTION OF THE PREFERRED EMBODIMENTS

Hereinafter, an embodiment will be described in detail with reference to the accompanying drawings. However, the scope of spirits of the present invention included in the embodiment will be able to be determined by matters disclosed in the embodiment and the spirits of the present invention included in the embodiment include modified examples such as addition, deletion, modifications, etc of components.

In the following description, a term, "comprising" does not exclude the presence of components or steps other than ones described.

FIGS. 1 to 4 are block diagrams showing exemplary embodiments of a configuration of a power supply unit and a panel driving unit that are provided in a display device according to the present invention.

Figure 1:
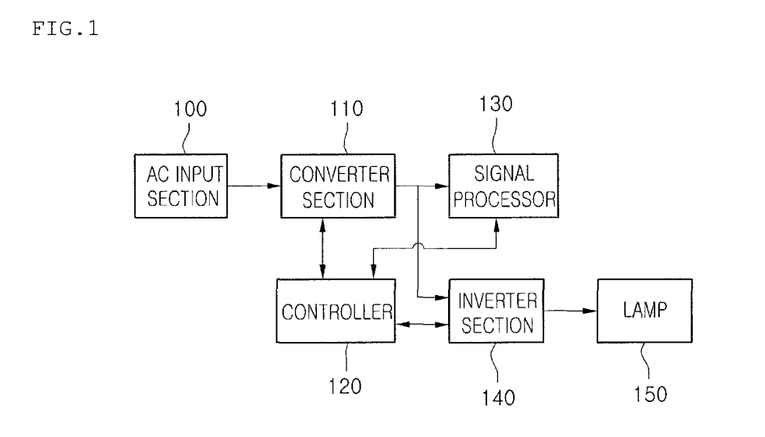
FIGS. 1 to 4 are block diagrams showing exemplary embodiments of a configuration of a power supply unit and a panel driving unit that are provided in a display device according to the present invention.

Referring to FIG. 1, the display device according to the exemplary embodiment of the present invention may include a signal processor 130 controlling to process and output a video signal and a sound signal, a lamp 150 generating light, and a power supply unit supplying power to the signal processor 130 and the lamp 150.

The power supply unit may include an AC input section 100 receiving AC power, a converter section 110 converting and outputting the AC power inputted from the AC input section 100 into DC power, and an inverter section 140 converting the DC power outputted from the converter section 110 into AC power. As shown in FIG. 1, the signal processor 130 may operate by using the power outputted from the converter section 110 and the power outputted from the inverter section 140 may be supplied to the lamp 150.

A controller 120 receives switching frequencies from the converter section 110, the inverter section 140, and the signal processor 130, compares the received switching frequencies with each other, and adjusts the switching frequency of at least one of the converter section 110, the inverter section 140, and the signal processor 130 in accordance with the comparison result.

Each of the converter section 110, the inverter section 140, and the signal processor 130 may include a switching portion (not shown) performing on and off switching operations. As a result, signals generated by operating the converter section 110, the inverter section 140, and the signal processor 130 may have their own switching frequencies.

In the case in which the switching frequencies of the signals generated from the converter section 110, the inverter section 140, and the signal processor 130 are overlapped with each other, noise may be generated by frequency mutual-interference, which may deteriorate EMI characteristics of the display device.

Therefore, in the power supply unit according to the exemplary embodiment of the present invention, the controller 120 compares whether the switching frequencies of the converter section 110, the inverter section 140, and the signal processor 130 are overlapped with each other and thereafter, adjusts the switching frequency of at least one of the converter section 110, the inverter section 140, and the signal processor 130 to prevent the switching frequencies of the converter section 110, the inverter section 140, and the signal processor 130 from being overlapped with each other when the switching frequencies belong to an interference range in which the switching frequencies are overlapped with each other according to the comparison result.

For example, the controller 120, the controller 120 receives the switching frequencies of the converter section 110 and the signal processor 130 and calculates a difference between the two switching frequencies. Therefore, when the calculated difference between the switching frequencies is equal to or less than a reference value which is a predetermined interference range, the controller 120 may output a control signal for adjusting the switching frequency of the converter section 110 or the signal processor 130 to the converter section 110 or the signal processor 130.

Further, the controller 120 receives the switching frequencies of the inverter section 140 and the signal processor 130 and calculates a difference between the two switching frequencies. Therefore, when the calculated difference between the switching frequencies is equal to or less than a reference value which is a predetermined interference range, the controller 120 may output a control signal for adjusting the switching frequency of the inverter section 140 or the signal processor 130 to the converter section 140 or the signal processor 130.

Meanwhile, the controller 120 receives the switching frequencies of the converter section 110 and the inverter section 140 and calculates a difference between the two switching frequencies. Therefore, when the calculated difference between the switching frequencies is equal to or less than a reference value which is a predetermined interference range, the controller 120 may output a control signal for adjusting the switching frequency of the converter section 110 or the inverter section 140 to the converter section 110 or the inverter section 140.

As described above, in order to adjust the switching frequency of the converter section 110, the inverter section 140, or the signal processor 130, the controller 120 may adjust a voltage magnitude of the control signal outputted to the converter section 110, the inverter section 140, or the signal processor 130.

For example, in order to adjust the switching frequency of the converter section 110, the controller 120 may reduce the voltage magnitude of the control signal supplied to the converter section 110 and more particularly, the switching frequency of the converter section 110 may vary in proportion to the voltage magnitude of the control signal supplied from the controller 120 to the converter 110.

Further, when the difference between the switching frequencies of the converter section 110 and the signal processor 130 is equal to or less than the reference value, the controller 120 may control the difference between the two switching frequencies to be more than the reference value by increasing or decreasing the switching frequency of the converter section 110 or the signal processor 130.

For example, when the switching frequency of the converter section is 61 kHz, the switching frequency of the signal processor 130 is 56 kHz, and the reference value which is the interference range is 5 kHz, the difference (5 kHz) between the two switching frequencies is equal to or less than the reference value (5 kHz). Therefore, the controller 120 may adjust the switching frequency of the converter section 110 by increasing the corresponding switching frequency to be more than 61 kHz or adjust the switching frequency of the signal processor 130 by decreasing the corresponding switching frequency to be less than 56 kHz.

Further, controller 120 may reduce the frequency interference between the inverter section 140 and the signal processor 130 or the frequency interference between the converter section 110 and the inverter section 140 by using such a method.

The operation of the controller 120 may implemented by a mi-com.

Figure 2:
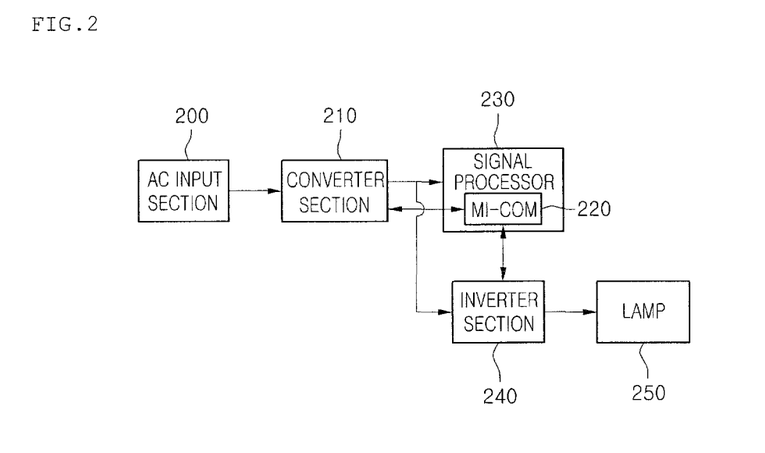

Referring to FIG. 2, a signal processor 230 for driving the display panel may be mounted with a mi-com 220 which performs the operation of the controller 120.

As described above, the mi-com 220 compares switching frequencies of a converter section 210, an inverter section 240, and the signal processor 230 with each other to adjust the switching frequency of at least one of the converter section 210, the inverter section 240, and the signal processor 230 to a range in which mutual interference is not generated according to the comparison result.

Figure 3:
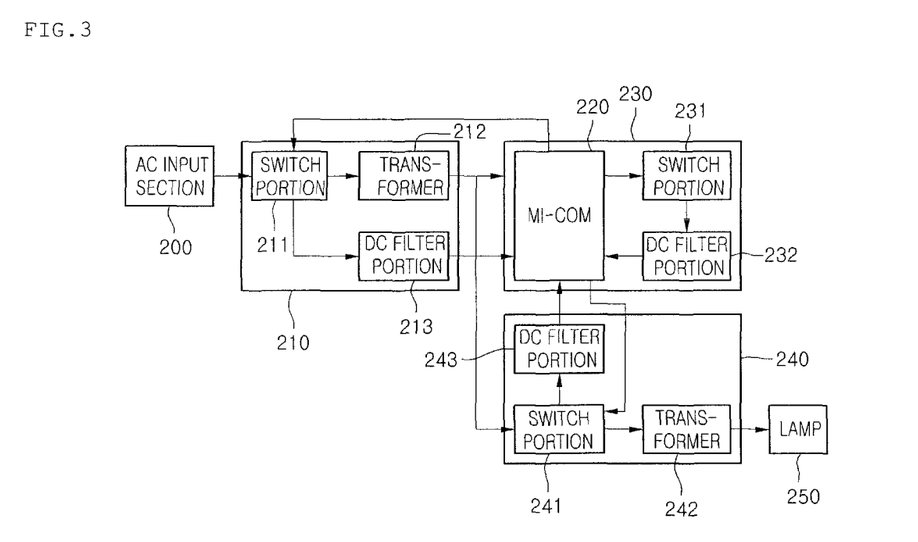

Referring to FIG. 3, the converter section 210, the signal processor 230, and the inverter section 240 may include DC filter portions 213, 232, and 243 for converting a signal generated by an on/off switching operation of a circuit, for example, a sine wave signal into a DC signal of a pulse type, respectively.

The DC filter portions 213, 232, and 243 convert a signal generated from each circuit into signals of the pulse type which can be easily compared in the mi-com 220.

Hereinafter, the exemplary embodiment of the operation of the mi-com 220 will be described in more detail.

As shown in FIG. 3, the converter section 210 and the inverter section 240 may include switch portions 211 and 241 and transformers 212 and 242, respectively.

The switch portion 211 of the converter section 210 repetitively performs the on and off operations in order to transfer received primary-terminal power to a secondary terminal. In general, a part up to a primary coil of the transformer 212 is referred to as a primary terminal and a part from a secondary coil of the transformer is referred to as a secondary terminal.

The transformer 212 of the converter section 210 transfers primary-terminal power to the secondary terminal depending on the on or off operation of the switch portion 211. The transformer 212 generates inductive power by the on and off operations of the switch portion 211 and transfers the generated inductive power to the secondary terminal.

In addition, the converter section 210 may include the DC filter portion 213 for converting a frequency generated from the switch portion 211 or the transformer 212 into a signal of a pulse type. The DC filter portion 213 converts the switching frequency generated from the converter section 210 into a signal of a DC pulse type and transfers the converted signal to the mi-com 220 of the signal processor 230.

Meanwhile, power outputted from the converter section 210 is transferred to the signal processor 230 and elements constituting the signal processor 230 use the transferred power as driving power.

Figure 4:
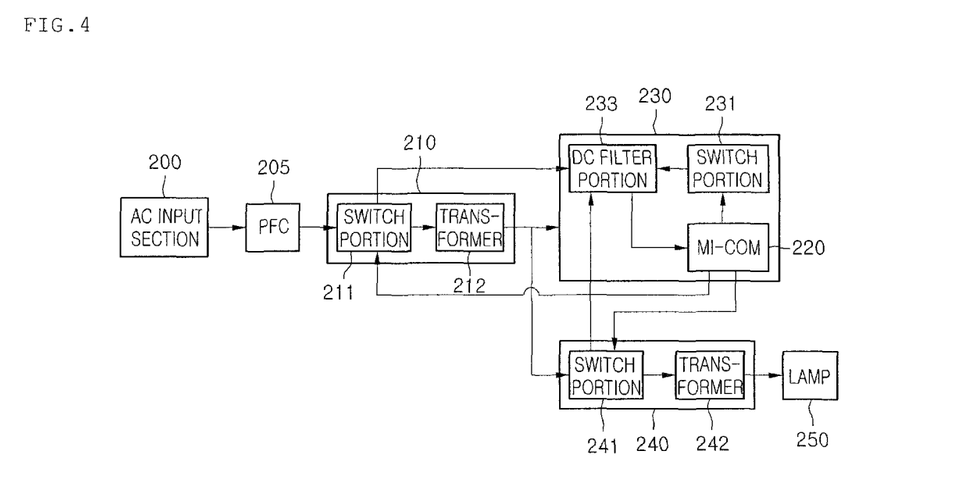

One power is outputted from the converter section 210 in FIGS. 2 to 4, but the number of the output powers may depend on a user set-up or a magnitude of power which each of the element constituting the signal processor 230 requires. That is, the magnitude and number of the output powers of the transformer 212 may vary by changing the configuration of the transformer 212 of the converter section 210.

Further, the inverter section 240 serves to convert inputted DC power into AC power. Since operations performed by the switch portion 241 and the transformer 242 constituting the inverter section 240 are similar to operations of the switch portion 211 and the transformer 212 constituting the converter section 210, a detailed description thereof will be omitted.

However, the transformer 212 of the converter section 210 may decrease the magnitude of the transferred power, while the transformer 242 of the inverter section 240 may increase the magnitude of the transferred power.

For example, the magnitude of the power outputted from the transformer 242 of the inverter section 240 may be approximately 1.8 kV and the power outputted from the inverter section 240 is transferred to a lamp 250 and the lamp 250 may be driven by the transferred power.

As shown in FIG. 3, the inverter section 240 may also include the DC filter portion 243. The DC filter portion 243 converts the switching frequency generated by operating the inverter section 240 into a signal of a pulse type which can be compared and analyzed by the mi-com 220 and outputs it to the mi-com 220.

Further, the signal processor 230 may also include the DC filter portion 232 for converting a switching frequency generated from an electronic circuit such as a main IC chip, and the like into the signal of the pulse type. The DC filter portion 232 of the signal processor 230 also outputs the pulse-converted signal to the mi-com 220.

Meanwhile, referring to FIG. 4, the power supply unit according to the exemplary embodiment of the present invention may further include a power factor correction (PFC) section 205 performing power factor correction with respect to the power outputted from the AC input section 200. When the transferred power is used without being processed, the use efficiency of the power may be deteriorated.

Therefore, the PFC section 205 performs the power factor correction with respect to the transferred power and improves the use efficiency of the power and thereafter, transfers the power to the converter section 210.

Further, as shown in FIG. 4, only the signal processor 230 may include the DC filter portion 233. In this case, the DC filter portion 233 of the signal processor 230 may receive the signals generated with the switching frequencies from the switch portions 211, 231, and 241 of the converter section 210, the signal processor 230, and the inverter section 240, respectively, and convert the received signals into the signals of the pulse type and then output them to the mi-com 220.

As a result, the mi-com 220 may receive the switching frequencies of the converter section 210, the signal processor 230, and the inverter section 240.

Figure 5:
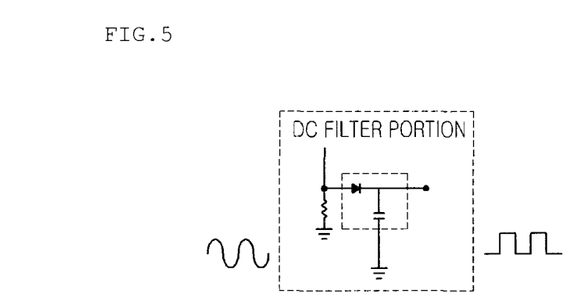
FIG. 5 shows an exemplary embodiment of a circuit configuration of the DC filter portion of FIGS. 3 and 4.

FIG. 5 shows an exemplary embodiment of a circuit configuration of the DC filter portions 213, 232, and 243.

Referring to FIG. 5, the DC filter portions 213, 232, and 243 are the circuits that convert and output received sine waves into signals of a pulse wave type having a predetermined duty. According to the exemplary embodiment of the present invention, the DC filter portions 213, 232, and 243 may convert frequencies of sine waves generated from the electronic circuits into waveforms of a pulse type for ease of comparison and analysis by the mi-com 220.

The DC filter portions 213, 232, and 243 include a diode for rectifying the received sine wave, a capacitor connected to a cathode of the diode, and a resistor connected to an anode of the diode. The capacitor and the resistor may be grounded.

The circuit constituted by the resistor, the diode, and the capacitor as the configuration for converting the signal of the sine wave into the signal of the pulse type is shown in FIG. 5, but those skilled in the art will be able to easily think out various types of DC filter portions by referring to the detailed description of the present invention.

Figure 6:
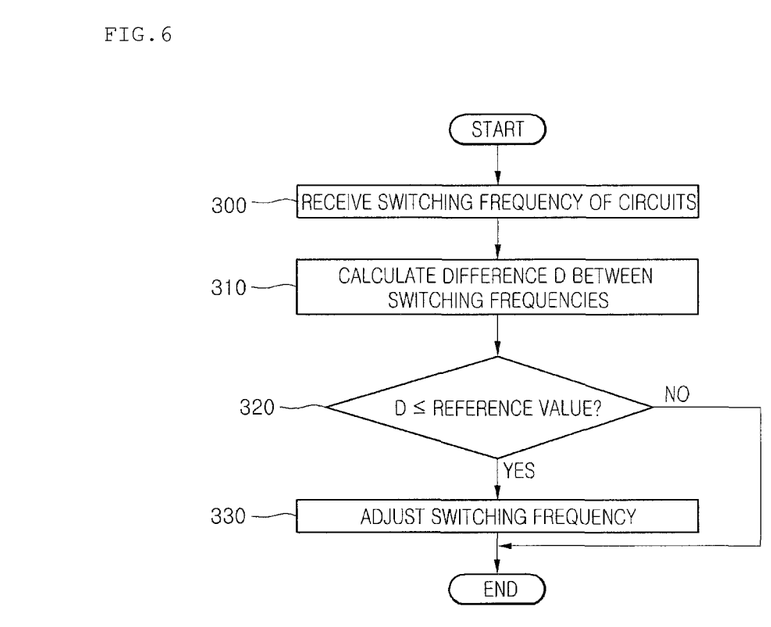
FIG. 6 is a flowchart showing a power supply control method according to an exemplary embodiment of the present invention.

The operation of the mi-com 220 will be described in more detail with reference to a flowchart showing a power supply control method according to an exemplary embodiment of the present invention shown in FIG. 6.

The mi-com 220 receives the switching frequencies of the converter section 210, the signal processor 230, and the inverter section 240 (S300) and calculates differences d among the received switching frequencies (S310).

As described above, the switching frequencies generated from the converter section 210, the signal processor 230, and the inverter section 240 are converted into the DC signal of the pulse type through the DC filter portions and the pulse-converted signals may be transferred to the mi-com 220.

In this case, the mi-com 220 analyzes each received pulse signal and performs an operation for setting a coefficient for each signal to acquire the switching frequencies of the converter section 210, the signal processor 230, and the inverter section 240. Herein, the coefficient for each pulse signal may be on duty/total duty.

That is, an ON time per unit pulse is set as a coefficient for the corresponding pulse signal with respect to the received pulse-converted signal. This represents magnitudes of the frequencies generated from the electronic circuits and is used for ease of comparison and analysis by the mi-com 220 as described above.

For example, when the switching frequency generated from the switch portion 211 of the converter section 210 is 62 kHz, a coefficient analyzed by the mi-com 220 is 62 and when the switching frequency generated from the switch portion 241 of the inverter section 240 is 53 kHz, a coefficient analyzed by the mi-com 220 may be 53.

Further, when the frequency generated from the switch portion 231 of the signal processor 230 is 46 kHz, a coefficient analyzed by the mi-com 220 may be 46.

Thereafter, the mi-com 220 determines whether or not the calculated differences d among the switching frequencies are equal to or less than a predetermined reference value (S320).

For example, the mi-com 220 determines whether or not the difference d between the switching frequencies generated from any two circuits among the converter section 210, the signal processor 230, an the inverter section 240 is equal to or less than the reference value, that is, whether or not the difference d is within the interference range. In the interference range set by the reference value, frequency interference between two signals occurs to generate EMI noise.

In other words, assumed that the switching frequency generated from the converter section 210 is represented by A, the switching frequency generated from the inverter 240 is represented by B, and the switching frequency generated from the signal processor 230 is represented by C and when A is set as a reference frequency, the differences d among the switching frequencies may be |A-B| and |A-C|.

Assumed that the reference value is set to 5 kHz, that is, the interference range is set to 5 kHz or less, if A is 62 kHz, B is 53, and C is 46 kHz, A-B is 9 and A-C is 18, such that the difference d between the switching frequencies does not belong to the interference range.

In this case, the mi-com 220 judges that the EMI noise by the frequency interference is not generated and holds the switching frequencies of the converter section 210, the signal processor 230, and the inverter section 240 without adjusting the corresponding switching frequencies. For this, the mi-com 220 may output a normal control signal, i.e., a control signal having a voltage magnitude of 5V to the converter section 210, the signal processor 230, and the inverter section 240.

On the contrary, the switching frequency generated from the converter section 210 may increase to 61 kHz due to an increase of noise of wall power, the switching frequency generated from the inverter section 240 may become 57 kHz due to a cold cathode fluorescent lamp (CCFL) characteristic variation, and the kike, and the switching frequency generated from the signal processor 230 may become 56 kHz due to a change of an inductance characteristic of an audio amp coil.

That is, the switching frequency generated from each electronic circuit may be changed due to a change of an element characteristic in the display device.

In this case, in the case of the difference d between the switching frequencies, which is calculated by the mi-com 220, A-B is 4 kHz and A-C is 5 kHz. They are equal to or less than 5 kHz which is the reference value and is judged to belong to the predetermined interference range.

As such, when the difference d between the switching frequencies is equal to or less than the reference value, the mi-com 220 may adjust the switching frequency of at least one of the converter section 210, the signal processor 230, and the inverter section 240 (S330).

For example, the mi-com 220 may output an abnormal control signal i.e., a control signal having a voltage magnitude of 3V to at least one of the converter section 210, the signal processor 230, and the inverter section 240. The mi-com 220 may reduce the mutual interference of the switching frequency generated from each electronic circuit by adjusting the voltage magnitude of the supplied control signal.

As a result, the switching frequency interference generated from the power supply unit may be merely a temporary phenomenon and the EMI noise by consecutive frequency interference may not be consistently generated.

Further, the switch portions 211, 231, and 241 included in the converter section 210, the signal processor 230, and the inverter section 240 may include a switch (not shown) performing the on/off switching operation and a switching controller (not shown) controlling a switching operation of the switch (not shown). In this case, the switching controller (not shown) generates the switching control signal and supplies the generated switching control signal to the switch (not shown) to adjust a switching frequency generated from the switch (not shown) in accordance with a control signal inputted from the mi-com 220.

Figure 7:
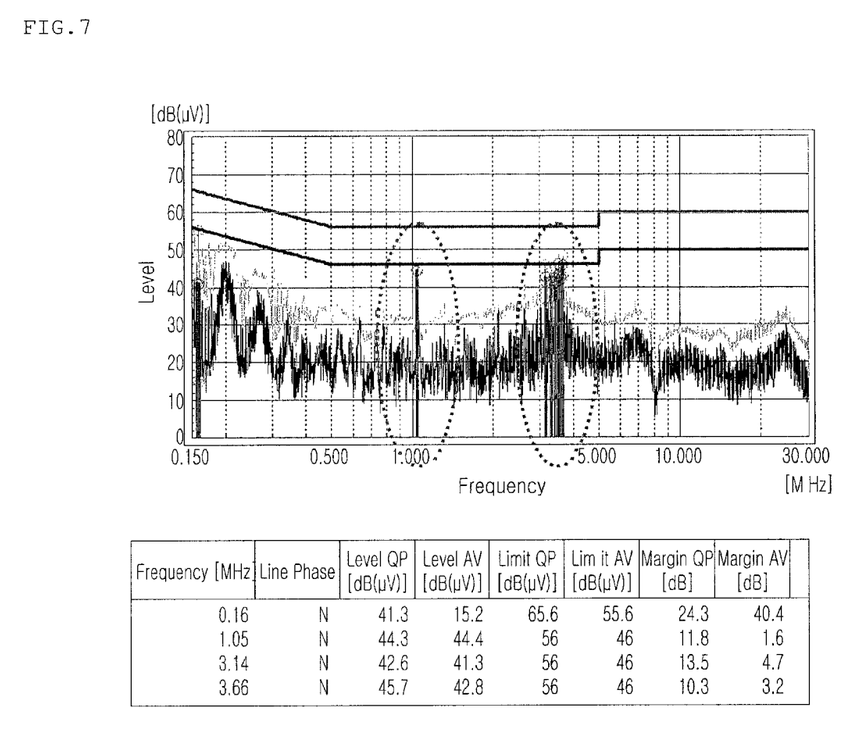
FIGS. 7 and 8 the frequency margin of power supply apparatus according to an exemplary embodiment of the present invention.
Figure 8:
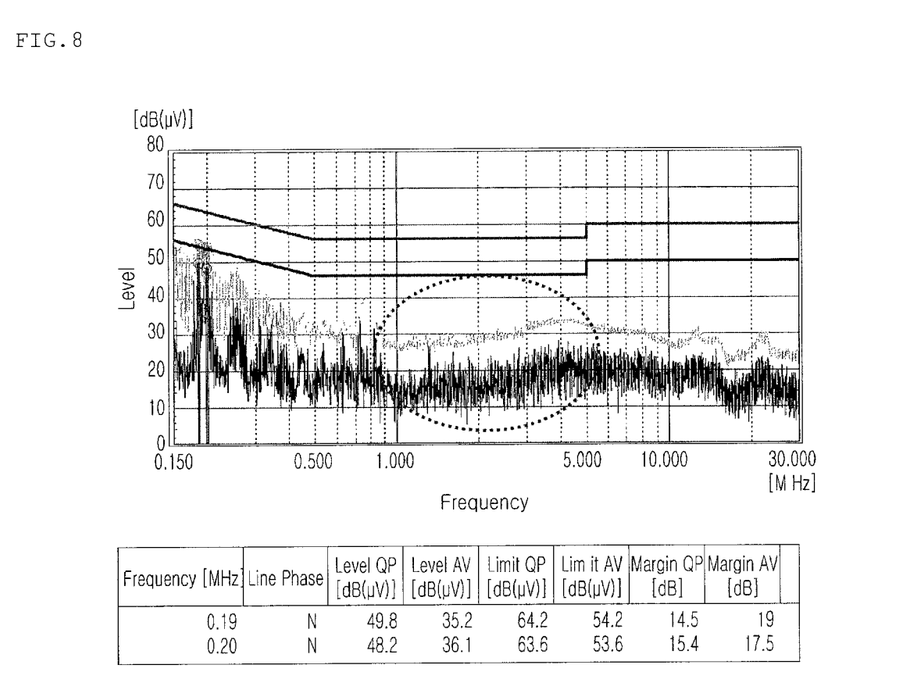

FIGS. 7 and 8 are graphs showing a frequency margin for each band of a power supply unit according to an exemplary embodiment of the present invention.

FIGS. 7 and 8 are graphs showing a frequency margin for each band with respect to frequency interference generating EMI noise in the related art and according to an exemplary embodiment of the present invention.

Data disclosed in FIGS. 7 and 8 are used to verify an interference degree between frequencies generated from an electronic circuit and indicates that a probability of interference will is lower as a frequency margin is larger.

In addition, in the exemplary embodiment of the present invention, the magnitude of the power supplied to each electronic circuit varies depending on the variation of the frequency observed through the DC filter portion. The data disclosed in FIG. 8 is a result acquired by observing the frequency margin acquired by changing the magnitude of the power supplied to each electronic circuit through a variable resistance.

First, in FIG. 7, the frequency margin is observed in the case of configuring an EMI filter for each electronic circuit in the related art. Referring to FIG. 7, in the related art, a frequency margin having only a magnitude of approximately 1.6 dB is generated in a band of 1 MHz and a frequency margin having a magnitude 3.2 dB is generated in a band of 3.6 MHz.

Contrary to this, according to the exemplary embodiment of the present invention, when the magnitude of the power supplied to the electronic circuit is controlled as the magnitude of the frequency generated from each electronic circuit varies, a frequency margin of 17 dB or more may be ensured in a band of 0 to 5 MHz with reference to FIG. 8.

Specifically, in a table on the lower end of the graphs shown in FIGS. 7 and 8, a frequency band of noise irradiated from the display device (set) and a magnitude thereof, and a setting value of an equipment for measuring the irradiated noise are shown.

Referring to FIG. 7, in the related art, when the frequency of the noise irradiated from the display device is analyzed, principal noise are generated in bands of 0.16 MHz, 1.05 MHz, 3.14 MHz, and 3.66 MHz and peak values of the noises are measured as 41.3 dB, 44.3 dB, 42.6 dB, and 45.7 dB, respectively. Herein, the peak values of the noises are values acquired by converting a value of [μV] measured by the measurement equipment into [dB].

In addition, noise average values in the frequency bands are 15.2 dB, 44.4 dB, 41.3 dB, and 42.8 dB, respectively.

Frequency margins (frequency peak value margin and average margin) closely related with the generation of the EMI noise represent whether or not noise is distant from a predetermined average noise level (a kind of standard reference) and level peak values of the reference are 65.6 dB, 56 dB, 56 dB, and 56 dB and level average values of the reference are 55.6 dB, 46 dB, 46 dB, and 46 dB with respect to the frequencies.

In this case, margins of the peak values of the frequencies are represented as 24.3 dB, 11.8 dB, 13.5 dB, and 10.3 dB and average margins of the frequencies are observed as 40.4 dB, 1.6 dB, 4.7 dB, and 3.2 dB in the frequency bands.

It is seen if the frequency margin in the band of 0.16 MHz is a little ensured, but it is caused due to the characteristic of the measurement equipment used in an experiment and in the related art, the frequency margin is generally equal to or less than 5 dB.

Contrary to this, according to the exemplary embodiment of the present invention, the noise average margin is observed as 19 dB and 17.5 dB and the margin of the frequency peak value is observed as 14.5 dB and 15.4 dB in 0.19 dB and 0.20 dB. Therefore, a probability that the interference between the frequencies generated from the electronic circuits will occur is remarkably reduced.

According to the exemplary embodiments, the EMI filter needs not to be provided in each of electronic circuit elements and EMI noise can be more economically and efficiently reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the exemplary embodiments will be modified without departing from the sprit and scope of the present invention.

What is claimed is:

1. A power supply unit of a display device, comprising:
an AC input section receiving and supplying AC power;
a converter section converting the supplied AC power into DC power and supplying the converted DC power to a signal processor;
an inverter section converting the DC power outputted from the converter section into the AC power;
a controller comparing at least two of switching frequencies of the converter section, the inverter section, and the signal processor with each other and adjusting the switching frequency of at least one of the converter section, the inverter section, and the signal processor in accordance with the comparison result; and
a DC filter portion converting a signal outputted from at least one of the converter section, the inverter section, and the signal processor into a signal of a pulse type and outputting the converted signal to the controller,
wherein the DC filter portion includes a diode for rectifying an inputted sine wave, a capacitor connected to a cathode of the diode and a resistor connected to an anode of the diode, wherein the capacitor and the resistor are grounded.

2. The unit of claim 1, where the controller adjusts the switching frequency of any one of the converter section and the signal processor when a difference between the switching frequency of the converter section and the switching frequency of the signal processor is equal to or less than a reference value.

3. The unit of claim 2, wherein the controller adjusts the switching frequency so that the difference between the switching frequencies is larger than the reference value.

4. The unit of claim 1, wherein the controller adjusts the switching frequency of any one of the inverter section and the signal processor when a difference between the switching frequency of the inverter section and the switching frequency of the signal processor is equal to or less than the reference value.

5. The unit of claim 1, wherein the controller adjusts a voltage magnitude of a control signal outputted to at least one of the converter section, the inverter section, and the signal processor in accordance with the comparison result.

6. The unit of claim 1, wherein the controller compares the switching frequencies of the converter section and the inverter section with the switching frequency of the signal processor and adjusts the switching frequencies of the converter section and the inverter section in accordance with the comparison result.

7. The unit of claim 1, wherein the controller acquires the switching frequency of at least one of the converter section, the inverter section, and the signal processor by using the signal of the pulse type outputted from the DC filter portion.

8. A display panel driving unit for driving a display panel, comprising:
a signal processor processing an image signal supplied to the display panel;
an AC input section receiving and supplying the AC power;
a converter section converting the supplied AC power into DC power and supplying the converted DC power to the signal processor; and
an inverter section converting the DC power outputted from the converter section into the AC power,
wherein at least one of the converter section and the inverter section includes a switch portion, a transfoiiner generating and outputting inductive power in accordance with on/off switching of the switch portion and a DC filter portion converting a signal outputted from the switch portion into a signal of a pulse type,
wherein the DC filter portion includes a diode for rectifying an inputted sine wave, a capacitor connected to a cathode of the diode and a resistor connected to an anode of the diode, wherein the capacitor and the resistor are grounded, and
wherein the signal processor includes a mi-com that compares the switching frequencies of the converter section, the inverter section, and the signal processor with each other and adjusts the switching frequency of at least one of the converter section, the inverter section, and the signal processor in accordance with the comparison result.

9. The unit of claim 8, wherein the mi-com acquires the switching frequency of at least one of the converter section and the inverter section by using the signal of the pulse type outputted from the DC filter portion.

10. The unit of claim 8, wherein the signal processor includes a DC filter portion converting signals outputted from the converter section and the inverter section into the signals of the pulse type and outputting the converted signals to the mi-com.

11. The unit of claim 10, wherein the mi-com acquires the switching frequencies of the converter section, the inverter section, and the signal processor by using the signals of the pulse type outputted from the DC filter portion.

12. The unit of claim 8, wherein, the mi-com adjusts the switching frequency of at least one of the converter section and the signal processor so that the difference between the switching frequencies is larger than the reference value when a difference between the switching frequency of the converter section and the switching frequency of the signal processor is equal to or less than a reference value.

13. The unit of claim 12, wherein the mi-com supplies a first control signal to the converter section or the inverter section when the difference between the switching frequencies is equal to or less than the reference value and supplies a second control signal to the converter section or the inverter section when the difference between the switching frequencies is larger than the reference value, and a voltage magnitude of the first control signal is smaller than that of the second control signal.

14. The unit of claim 8, wherein the mi-com adjusts the switching frequency of at least one of the inverter section and the signal processor so that the difference between the switching frequencies is larger than the reference value when a difference between the switching frequency of the inverter section and the switching frequency of the signal processor is equal to or less than a reference value.

* * * * *